United States Patent
Ishida et al.

(10) Patent No.: US 10,350,496 B2
(45) Date of Patent: Jul. 16, 2019

(54) GAME DEVICE, GAME CONTROL METHOD, GAME CONTROL PROGRAM, MATCHING SERVER, MATCHING CONTROL METHOD, AND MATCHING CONTROL PROGRAM

(71) Applicant: Sony Computer Entertainment Inc., Tokyo (JP)

(72) Inventors: Takayuki Ishida, Tokyo (JP); Takeru Sankou, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 291 days.

(21) Appl. No.: 14/758,859

(22) PCT Filed: Jan. 30, 2014

(86) PCT No.: PCT/JP2014/000482
§ 371 (c)(1),
(2) Date: Jul. 1, 2015

(87) PCT Pub. No.: WO2014/119314
PCT Pub. Date: Aug. 7, 2014

(65) Prior Publication Data
US 2015/0336001 A1    Nov. 26, 2015

(30) Foreign Application Priority Data
Jan. 31, 2013   (JP) .................................. 2013-017745

(51) Int. Cl.
*A63F 13/537*   (2014.01)
*A63F 13/35*   (2014.01)
(Continued)

(52) U.S. Cl.
CPC ............ *A63F 13/537* (2014.09); *A63F 13/35* (2014.09); *A63F 13/45* (2014.09); *A63F 13/795* (2014.09); *A63F 13/847* (2014.09)

(58) Field of Classification Search
CPC ...... A63F 13/537; A63F 13/35; A63F 13/847; A63F 13/45; A63F 13/795
See application file for complete search history.

(56) References Cited

U.S. PATENT DOCUMENTS 6,042,476 A    3/2000 Ohashi
7,711,847 B2   5/2010 Dhupelia et al.
(Continued)

FOREIGN PATENT DOCUMENTS

CN    1190214 A    8/1998
CN    1556958 A    12/2004
(Continued)

OTHER PUBLICATIONS

Office Action for corresponding CN Application No. 201480059836, 11 pages, dated Dec. 1, 2016.
(Continued)

*Primary Examiner* — Kang Hu
*Assistant Examiner* — Thomas H Henry
(74) *Attorney, Agent, or Firm* — Matthew B. Dernier, Esq.

(57) ABSTRACT

A game device includes: a game control unit receiving instruction input from a player, and controlling a game; a mode selecting unit receiving, from the player, a selection of one of an intervention mode in which part of functions of the game is controlled according to instruction input from a different game device and a normal mode in which the part of the functions is controlled without depending on the instruction input from the different game device; an intervention requesting unit requesting another game device to
(Continued)

control the part of the functions when the intervention mode is selected; an intervention mode control unit transmitting information necessary to control the part of the functions to a game device responding to the request, receiving instruction input from the game device, and controlling the part of the functions; and a normal mode control unit controlling the part of the functions when the normal mode is selected.

16 Claims, 15 Drawing Sheets

(51) Int. Cl.
*A63F 13/847* (2014.01)
*A63F 13/45* (2014.01)
*A63F 13/795* (2014.01)

(56) References Cited

U.S. PATENT DOCUMENTS

| | | | |
|---|---|---|---|
| 8,998,720 B2 | 4/2015 | Dinka | |
| 2002/0091833 A1 | 7/2002 | Grimm | |
| 2003/0207704 A1* | 11/2003 | Takahashi | A63F 13/10 463/1 |
| 2004/0097287 A1* | 5/2004 | Postrel | G07F 17/32 463/41 |
| 2008/0004117 A1 | 1/2008 | Stamper | |
| 2008/0139318 A1* | 6/2008 | Van Luchene | A63F 13/12 463/42 |
| 2010/0279767 A1 | 11/2010 | Dhupelia et al. | |
| 2011/0244955 A1 | 10/2011 | Dinka | |

FOREIGN PATENT DOCUMENTS

| | | |
|---|---|---|
| CN | 102823238 A | 12/2012 |
| EP | 1219330 A2 | 7/2002 |
| JP | 2003320167 A | 11/2003 |
| JP | 2008194312 A | 8/2008 |
| JP | 201042083 A | 2/2010 |

OTHER PUBLICATIONS

International Preliminary Report on Patentability and Written Opinion for corresponding PCT Application No. PCT/JP2014/000482, dated Jun. 4, 2015.

International Search Report for corresponding PCT Application No. PCT/JP2014/000482, dated Apr. 22, 2014.

Biohazard 5 Saisoku Official Guide, 1st edition, Cap com Co., Ltd., pp. 1-5 (Mar. 5, 2009). (for relevancy see International Search Report for corresponding PCT Application No. PCT/JP2014/000482, dated Apr. 22, 2014).

Supplementary European Search Report for corresponding EP Application No. 14746110.7, 9 pages, dated Aug. 18, 2016.

* cited by examiner

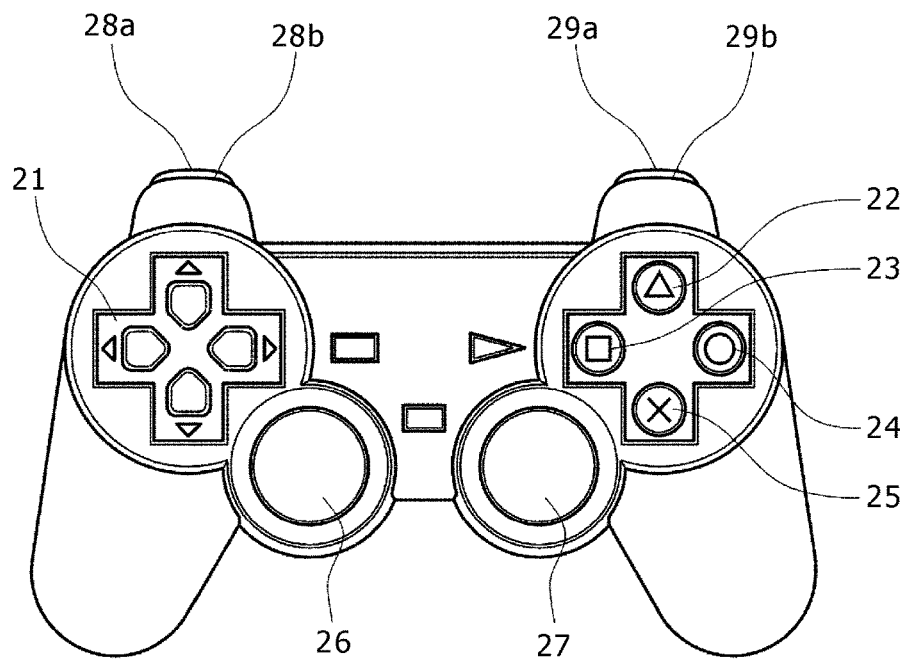

GAME DEVICE, GAME CONTROL METHOD, GAME CONTROL PROGRAM, MATCHING SERVER, MATCHING CONTROL METHOD, AND MATCHING CONTROL PROGRAM

TECHNICAL FIELD

The present invention relates to a game control technology, and particularly to a game device that controls a game executed between a plurality of players, a game control method, a game control program, a matching server, a matching control method, and a matching control program.

BACKGROUND ART

With the spread of terminal devices capable of executing games, a wide variety of kinds of games have been provided. Some games can be enjoyed casually in a short time, and some games are of types to be enjoyed thoroughly over a long period of time.

SUMMARY

Technical Problem

The provision of a wide variety of games in abundance of course has an advantage of widening a range of choice. On the other hand, there are players who are at a loss as to what to select from an excessive abundance of games. Many players hesitate to select a game that takes a long time or a game with a high degree of difficulty. There is a desire for a technology that provides opportunities for players to be able to experience such games casually.

The present invention has been made in view of such a situation. It is an object of the present invention to provide a technology that enables a player to enjoy a game more casually.

Solution to Problem

A mode of the present invention relates to a game control program. This game control program makes a computer function as: an instruction input receiving unit receiving instruction input from a first player, and notifying the instruction input to a control section controlling a game; a mode selecting unit receiving, from the player, a selection of one of an intervention mode in which part of functions of the game controlled by the control section is controlled according to instruction input from a second player different from the first player and a normal mode in which the part of the functions is controlled without depending on the instruction input from the second player; and a screen display section obtaining information necessary to display a game screen from the control section, and displaying the game screen on a display device, the control section receiving the instruction input from the second player and controlling the part of the functions when the intervention mode is selected, the control section controlling the part of the functions without depending on the instruction input from the second player when the normal mode is selected.

A computer is made to function as: an intervention application receiving unit presenting information on part of functions of a game controlled according to instruction input from a first player in order to invite a second player different from the first player to intervene in the game in an intervention mode in which the part of the functions of the game is controlled according to instruction input from the second player, and receiving an application for intervention that controls the part of the functions; and a notifying unit notifying information on a game device of the second player whose application is received by the intervention application receiving unit to a control section controlling the game.

It is to be noted that arbitrary combinations of the above constituent elements as well as modes obtained by converting expressions of the present invention between a method, a device, a system, and the like are also effective as modes of the present invention.

Advantageous Effect of Invention

According to the present invention, it is possible to provide a technology that enables a player to enjoy a game more casually.

BRIEF DESCRIPTION OF DRAWINGS

FIG. 3 is a diagram showing an external appearance of a controller.
FIG. 4 is a diagram showing an example of internal data of a cannon database.

DESCRIPTION OF EMBODIMENTS

A game system according to an embodiment enables a player to intervene casually in a game played by another player, and enjoy the game together with the other player. Hereinafter, for the convenience of description, the player as a side subjected to intervention will be referred to as a "first player," and the player as an intervening side will be referred to as a "second player." The second player is in charge of control of only part of functions of the game being played by the first player. Unlike a mere gallery, the second player intervenes in the game through instruction input for controlling the function that the second player himself/herself is in charge of. However, unlike the first player as the original player of the game, the second player does not take part in control of the whole of the game. Hence, it suffices for the second player to be in charge of only control of the part of the functions of the game with a high degree of difficulty. The second player can therefore enjoy the game by casually intervening in the game of the first player. In addition, the first player can enjoy the game together with the second player. Thus, the first player can have an enjoyment different from that of sole play, and enjoy the game without losing interest over a long period of time.

First Embodiment

Figure 1:
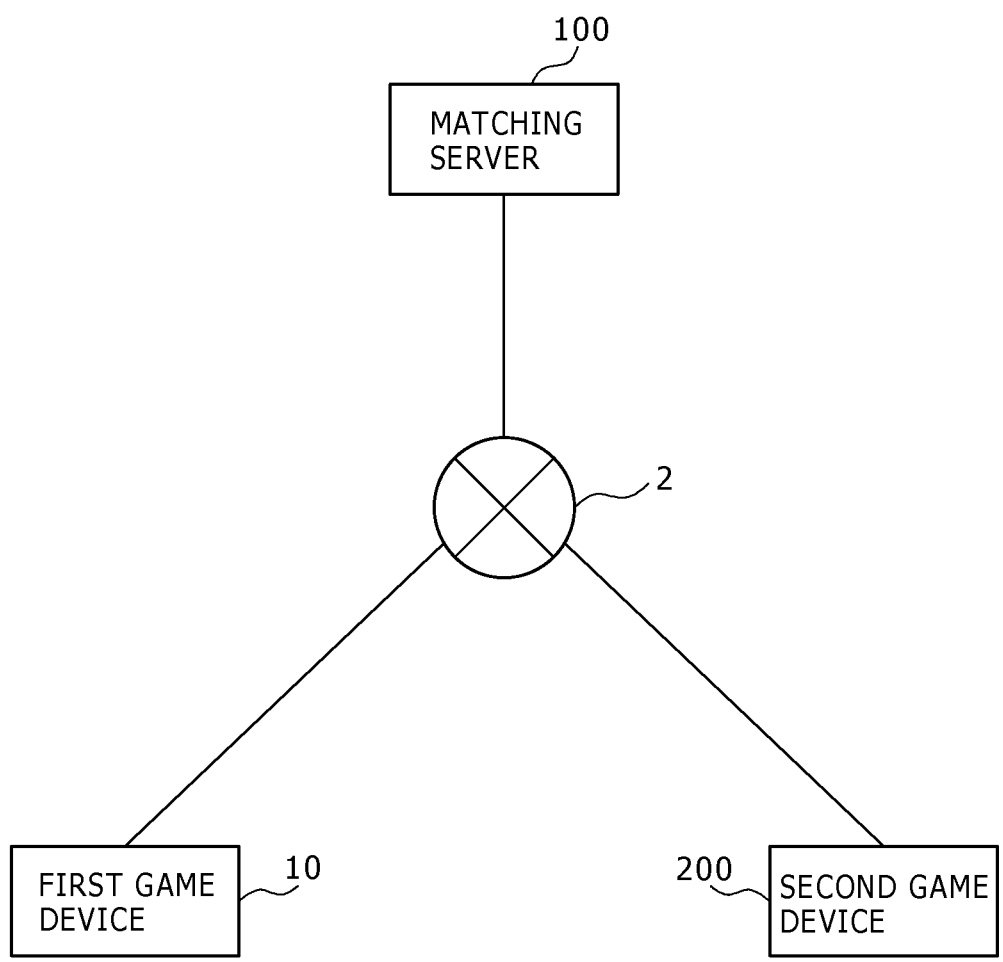
FIG. 1 is a diagram showing a general constitution of a game system according to a first embodiment.

FIG. 1 shows a general constitution of a game system according to a first embodiment. The game system 1 includes a matching server 100 managing matching between players of game devices, a first game device 10 of a first player, and a second game device 200 of a second player. The matching server 100 manages matching between the first player and the second player. The first player of the first game device 10 requests, via the Internet 2, the matching server 100 to invite the second player in charge of control of part of functions of a game executed in the first game device 10. The second player of the second game device 200 connects to the matching server 100 via the Internet 2, checks conditions of invitation to intervention in games executed in other first game devices 10, and selects a game in which the second player desires to intervene. When the second player of the second game device 200 selects the game in which the second player desires to intervene, the matching server 100 notifies information on the second game device 200 to the first game device 10 executing the selected game. The first game device 10 makes the game as a whole progress while receiving operation instructions for controlling the part of the functions subjected to the intervention from the second game device 200, and leaving the control of the part of the functions to the second game device 200.

A game of a tower defense type whose objective is to defend a tower provided in a territory by defeating enemies invading the own territory in a game field will be described in the following as an example of the game. In the game according to the present embodiment, the first player disposes batteries (cannons) in a path of invasion by the enemies in the game field, and attacks the invading enemies. The first player can allow the second player to be in charge of a function of attacking the enemies from a disposed battery.

Figure 2:
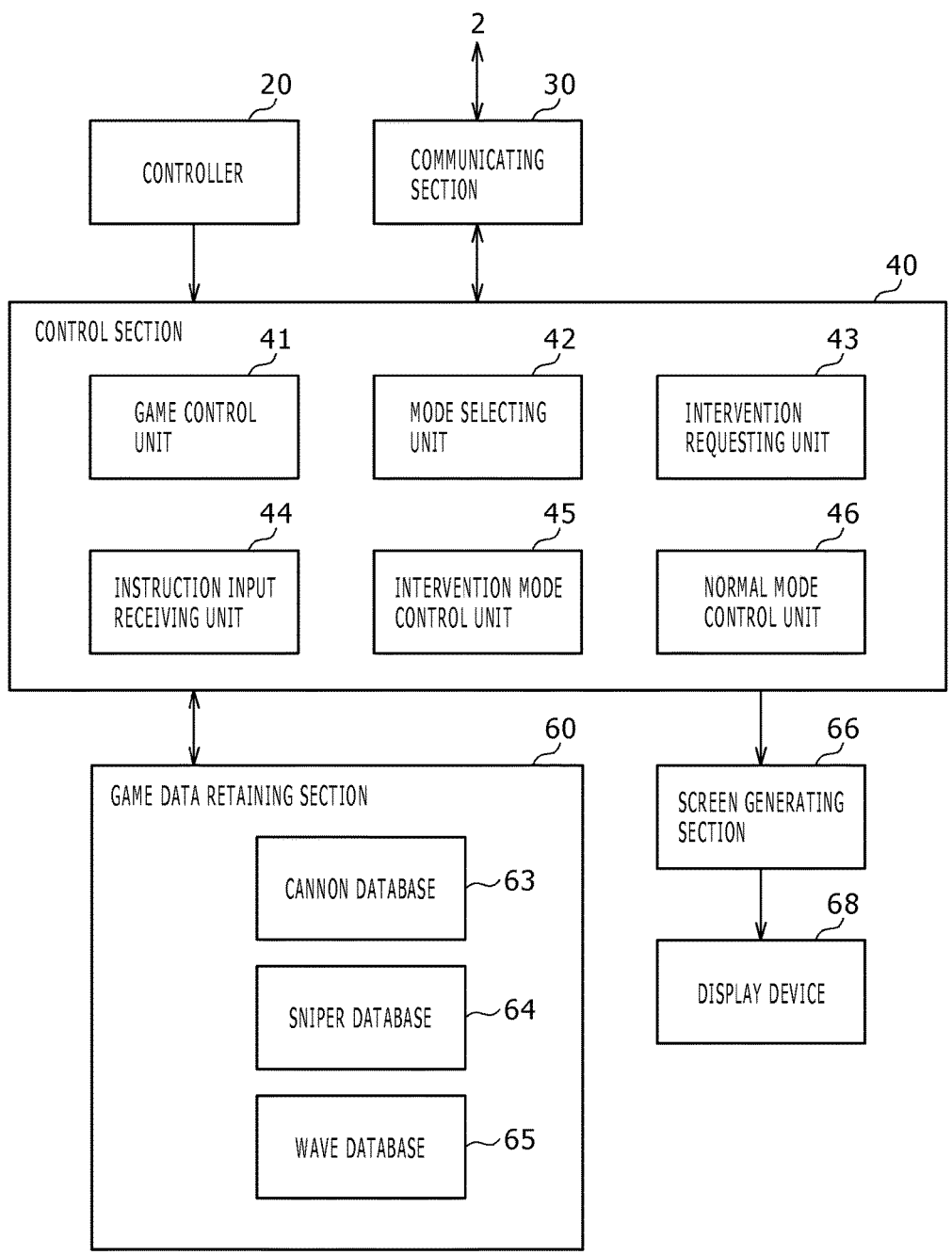
FIG. 2 is a diagram showing a configuration of a first game device according to the first embodiment.

FIG. 2 shows a configuration of the first game device 10 according to the first embodiment. The first game device 10 includes a controller 20, a communicating section 30, a control section 40, a game data retaining section 60, a screen generating section 66, and a display device 68. These configurations are implemented, in terms of hardware components, by the CPU of an arbitrary computer, a memory, a program loaded in the memory, and the like. In this case, however, the functional blocks implemented by cooperation of these configurations are depicted. Hence, it is to be understood by those skilled in the art that these functional blocks can be implemented in various forms by only hardware, only software, or combinations of hardware and software.

The communicating section 30 controls communication via the Internet 2. The communicating section 30 transmits and receives data to and from the matching server 100 and the second game device 200 via the Internet 2. The control section 40 makes the game progress on the basis of operating input from the player which operating input is received by the controller 20. The game data retaining section 60 retains data necessary for the progress of the game and the like. The game data retaining section 60 includes a cannon database 63, a sniper database 64, and a wave database 65. The screen generating section 66 generates the screen of the game controlled by the control section 40, and makes the screen displayed on the display device 68.

FIG. 3 shows an external appearance of the controller 20. The upper surface of the controller 20 is provided with direction keys 21, a triangle button 22, a square button 23, a circle button 24, a cross button 25, and analog sticks 26 and 27. In addition, the side surface of the controller 20 is provided with an L1 button 28a, an L2 button 28b, an R1 button 29a, and an R2 button 29b.

FIG. 4 shows an example of internal data of the cannon database 63. The cannon database 63 includes a battery ID field 70, a battery classification field 71, a maximum power field 72, a maximum burst field 73, a position field 74, a price field 75, and a control field 76. The battery ID field 70 stores the ID of a battery provided in the own territory within the game field. The battery classification field 71 stores the classification of the battery. In the game according to the present embodiment, two kinds of batteries, that is, large batteries and small batteries can be installed. The maximum power field 72 stores the maximum power of the battery. The maximum burst field 73 stores a maximum number of consecutive shots of the battery. The position field 74 stores coordinates indicating a position at which the battery is disposed. The price field 75 stores a price necessary to dispose the battery. The control field 76 stores an entity that controls the battery. As will be described later, in a normal mode, all batteries are automatically controlled by a normal mode control unit 46, whereas in an intervention mode, the battery to which the second player is assigned is controlled by the second player of the second game device 200 via an intervention mode control unit 45, and a battery to which the second player is not assigned is automatically controlled by a normal mode control unit 46.

Figure 5:
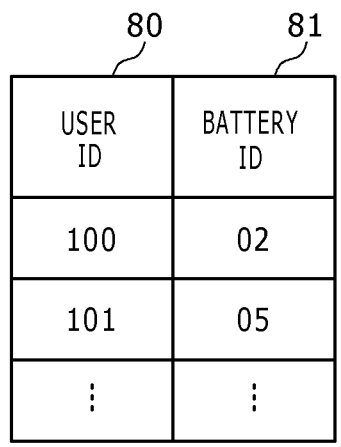
FIG. 5 is a diagram showing an example of internal data of a sniper database.

FIG. 5 shows an example of internal data of the sniper database 64. The sniper database 64 includes a user ID field 80 and a battery ID field 81. The user ID field 80 stores the user ID of the second player assigned to the battery. The battery ID field 81 stores the battery ID of the battery to which the second player is assigned.

Figure 6:
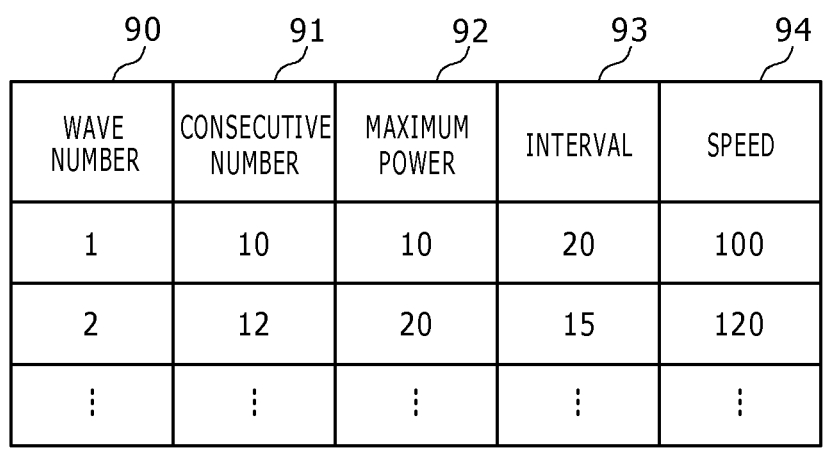
FIG. 6 is a diagram showing an example of internal data of a wave database.

FIG. 6 shows an example of internal data of the wave database 65. The wave database 65 includes a wave number field 90, a consecutive number field 91, a maximum power field 92, an interval field 93, and a speed field 94. The wave number field 90 stores the number of a wave. The consecutive number field 91 stores a consecutive number of attacks of enemies included in the wave. The maximum power field 92 stores the maximum power of the enemies included in the wave. The interval field 93 stores intervals between the attacks of the plurality of enemies included in the wave. The speed field 94 stores the speed of the attacks of the enemies included in the wave.

Returning to FIG. 2, the control section 40 includes a game control unit 41, a mode selecting unit 42, an intervention requesting unit 43, an instruction input receiving unit 44, an intervention mode control unit 45, and a normal mode control unit 46.

The instruction input receiving unit 44 receives instruction input from the first player via the controller 20. The instruction input receiving unit 44 notifies the received instruction input to other configurations of the control section that controls the game, for example, the game control unit 41, the mode selecting unit 42, the normal mode control unit 46, and the like.

The game control unit 41 receives the instruction input from the player, and controls the game. In the present embodiment, as described earlier, the game control unit 41 controls the game of the tower defense type. The game control unit 41 disposes batteries in the game field according to the instruction input from the first player, and stores information on the disposed batteries in the cannon database 63. After the disposition of the batteries is ended, the game control unit 41 refers to the wave database 65, creates a wave, and makes the enemy legion invade the game field. When enemies reach the tower, the game control unit 41 decreases the life of the first player according to the number of the enemies that have reached the tower. The game is over when the life becomes zero. When all of enemies included in the wave are annihilated before the life becomes zero, the game is cleared.

The mode selecting unit 42 receives, from the player, a selection of one of an intervention mode in which part of functions of the game controlled by the game control unit 41 is controlled according to instruction input from the second game device 200 different from the first game device 10 that includes the control section 40 and a normal mode in which the part of the functions is controlled without depending on the instruction input from the second game device 200. As described earlier, in the present embodiment, the second game device 200 is allowed to take charge of control of a battery in the game of the tower defense type.

When the intervention mode is selected, the intervention requesting unit 43 requests the control of the battery from another game device. As will be described later, in the present embodiment, the intervention requesting unit 43 requests the matching server 100 to invite a second game device 200 that intervenes. In another example, the intervention requesting unit 43 may directly request a particular second game device 200 to intervene, or the intervention requesting unit 43 itself may invite a second game device 200 that intervenes. For example, the second game device 200 of a second player registered in a player database not shown in the figure may be directly requested to intervene. In addition, another game device presents in a neighborhood may be requested to intervene by radio communication, or an intervention request may be broadcast to a particular network.

When the second game device 200 that intervenes is determined, the intervention requesting unit 43 obtains information on the second game device 200, and stores the information on the second game device 200 in the sniper database 64. When a plurality of second game devices 200 are made to take charge of control of a plurality of batteries, the intervention requesting unit 43 may automatically determine the batteries assigned to the second game devices 200 according to information on the second game devices 200, for example the attributes of the second players or the like, or may determine the batteries assigned to the second game devices 200 according to an instruction from the first player.

The intervention mode control unit 45 transmits information necessary to control the battery to the second game device 200 of the second player assigned to the battery in response to a request from the intervention requesting unit 43. The intervention mode control unit 45 receives instruction input by the second player from the second game device 200, and controls the battery assigned to the second game device 200.

The normal mode control unit 46 automatically controls the battery when the normal mode is selected. The normal mode control unit 46 generates instruction input for controlling the battery according to predetermined conditions, and controls the battery. Also in the intervention mode, the normal mode control unit 46 controls a battery that is not controlled by the second player.

The intervention mode control unit 45 and the normal mode control unit 46 may share part of functions. For example, an algorithm for receiving designations of a sight, power, and the number of consecutive shots and shelling enemies from batteries may be common. The instructions of a sight, power, and the number of consecutive shots may be received from the second player via the intervention mode control unit 45 in the intervention mode, and may be automatically generated by the normal mode control unit 46 in the normal mode. The intervention mode control unit 45 may correct operation instructions received from the second player according to the attributes or level of the second player who controls the battery. For example, when the level of the second player is lower than a predetermined value, the sight may be corrected to an enemy presents within a predetermined range of the position of the received sight.

Figure 7:
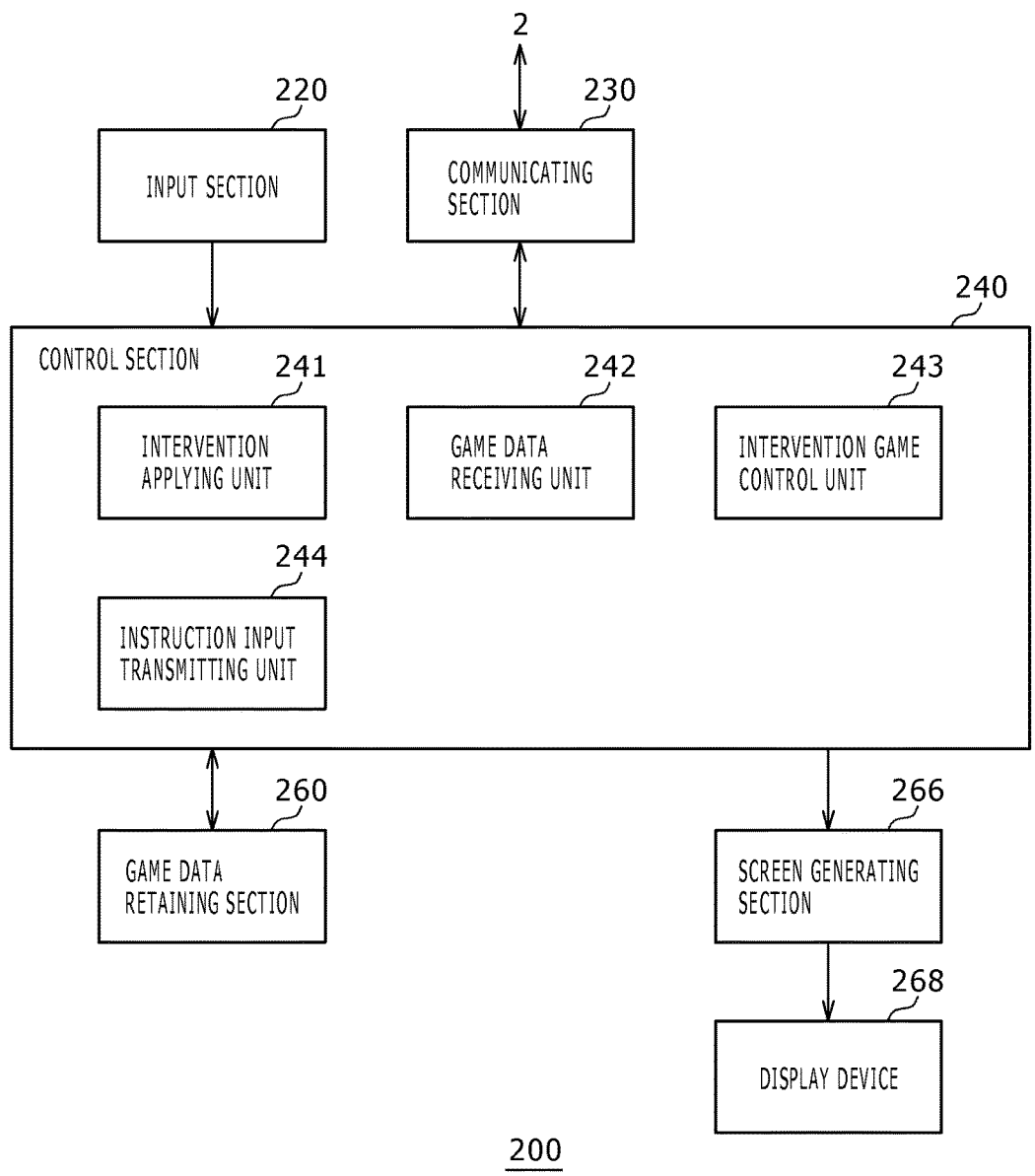
FIG. 7 is a diagram showing a configuration of a second game device according to the first embodiment.

FIG. 7 shows a configuration of the second game device 200 according to the first embodiment. The second game device 200 includes an input section 220, a communicating section 230, a control section 240, a game data retaining section 260, a screen generating section 266, and a display device 268. These configurations can also be implemented in various forms by only hardware, only software, or combinations of hardware and software.

The communicating section 230 controls communication via the Internet 2. The communicating section 230 transmits and receives data to and from the matching server 100 and the first game device 10 via the Internet 2. The control section 240 makes the game progress on the basis of operating input from the player which operating input is received by the input section 220. The game data retaining section 260 retains data necessary for the progress of the game and the like. The screen generating section 66 generates the screen of the game controlled by the control section 240, and makes the screen displayed on the display device 268.

The control section 240 includes an intervention applying unit 241, a game data receiving unit 242, an intervention game control unit 243, and an instruction input transmitting unit 244.

The intervention applying unit 241 accesses the matching server 100, obtains information on first game devices 10 requesting intervention, and displays the information on the first game devices 10 on the display device 268. The intervention applying unit 241 receives a selection of a first game device 10 that the second player is to intervene with, and applies to the matching server 100 for intervention with the first game device 10.

The game data receiving unit 242 receives game data necessary for intervention from the first game device 10 that the intervention applying unit 241 has applied for intervention with, and stores the game data in the game data retaining section 260. The game data receiving unit 242 receives a program for performing functions of the game in which the second game device 200 intervenes (which game will hereinafter be referred to as an "intervention game"), data necessary for generating a game screen, and the like.

The intervention game control unit 243 refers to the game data stored in the game data retaining section 260, and controls intervention in the game being executed in the first game device 10. The intervention game control unit 243 may refer to the game data stored in the game data retaining section 260, generate a game screen of the intervention game, and display the game screen on the display device 268, or may display a game screen generated by the first game device 10 on the display device 268.

The instruction input transmitting unit 244 receives instruction input by the second player for the intervention game controlled by the intervention game control unit 243 via the input section 220, and transmits the instruction input to the first game device 10.

The second game device 200 controls only part of functions of the game executed in the first game device 10. The second game device 200 may therefore be a game device including hardware resources having lower specifications than the first game device 10. For example, the display device may be smaller than that of the first game device 10, CPU processing speed may be slower than that of the first game device 10, or memory capacity may be lower than that of the first game device 10. For example, the second game device 200 may be a portable gaming device, a mobile telephone, a smart phone, or the like. Hence, the second player can casually participate in and enjoy the game even when the second player does not have the first game device 10 necessary for executing the game.

Figure 8:
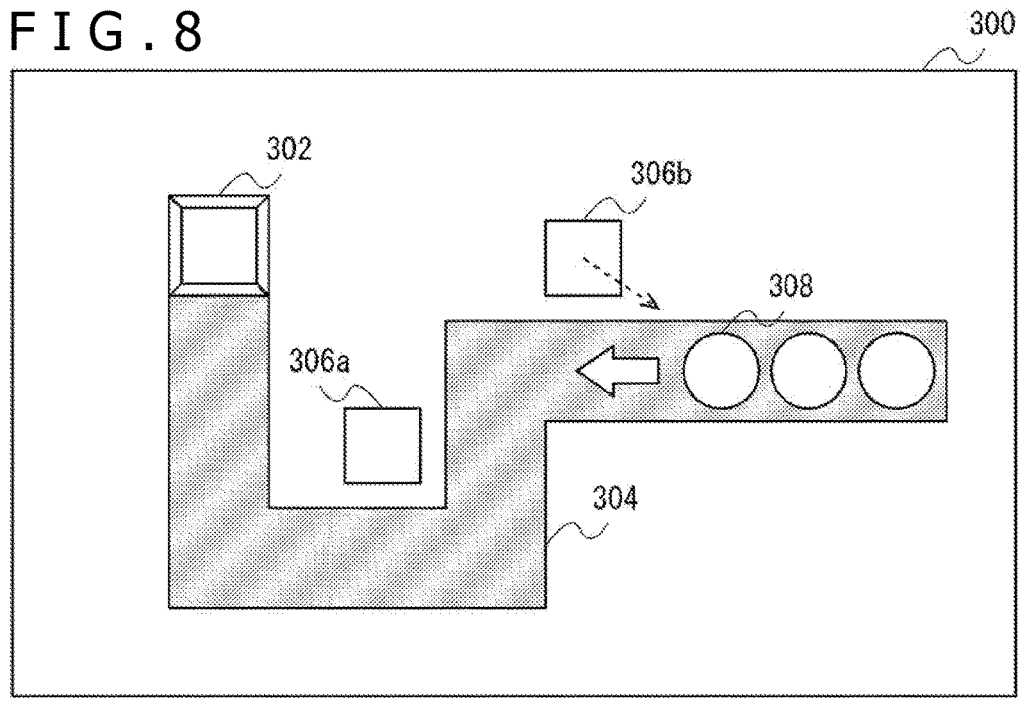
FIG. 8 is a diagram showing an example of a game screen displayed on the display device of the first game device.

FIG. 8 shows an example of a game screen displayed on the display device 68 of the first game device 10. The game screen 300 displays a tower 302 and batteries 306a and 306b provided in a game field. When the first player gives an instruction to start a wave after disposing the batteries 306a and 306b in the vicinity of a path of invasion 304 by enemies 308, the game control unit 41 makes the enemies 308 invade along the path of invasion 304 according to settings stored in the wave database 65. In the normal mode, the normal mode control unit 46 controls the batteries 306a and 306b to attack the enemies 308 from the batteries 306a and 306b.

Figure 9:
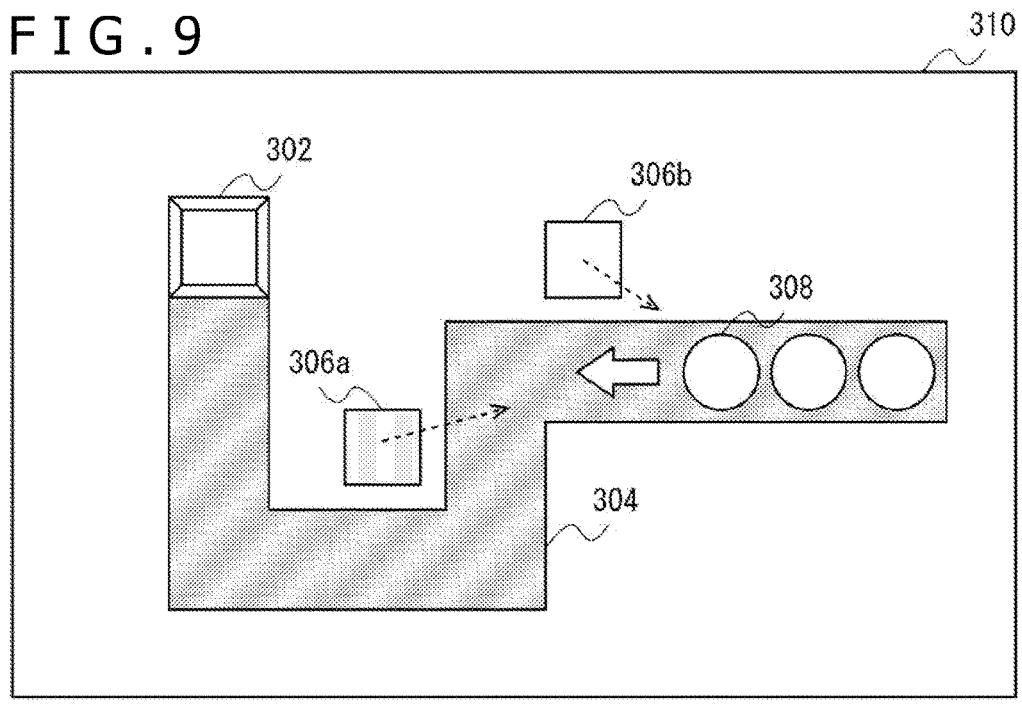
FIG. 9 is a diagram showing an example of the game screen displayed on the display device of the first game device.

FIG. 9 shows an example of a game screen displayed on the display device 68 of the first game device 10. The game screen 310 is an example of a game screen in the intervention mode. In the example shown in FIG. 9, the battery 306a is controlled by the second player. The intervention mode control unit 45 receives instruction input for controlling the battery 306a from the second game device 200 of the second player, and controls the battery 306a according to the instruction input. The battery 306b is controlled by the normal mode control unit 46.

Figure 10:
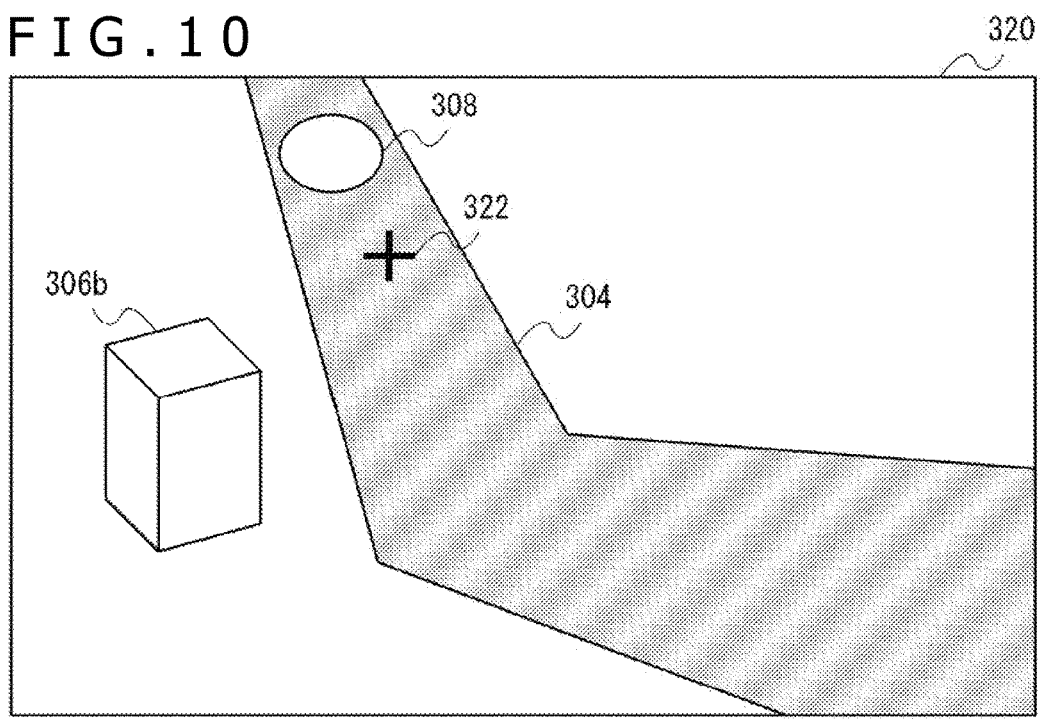
FIG. 10 is a diagram showing an example of a game screen displayed on the display device of the second game device.

FIG. 10 shows an example of a game screen displayed on the display device 268 of the second game device 200. Unlike the game screen 310 displayed on the first game device 10, the game screen 320 displayed on the second game device 200 does not display the entire game field, but displays only the state of the game field as viewed from the battery 306a controlled by the second game device 200. The second player operates a sight 322 for attack from the battery 306a, and attacks the enemies 308. The instruction input transmitting unit 244 transmits instruction input by the second player to the first game device 10. The screen generating section 266 generates the game screen 320 reflecting the instruction input by the second player which instruction input is transmitted to the first game device 10, and displays the game screen 320 on the display device 268.

Figure 11:
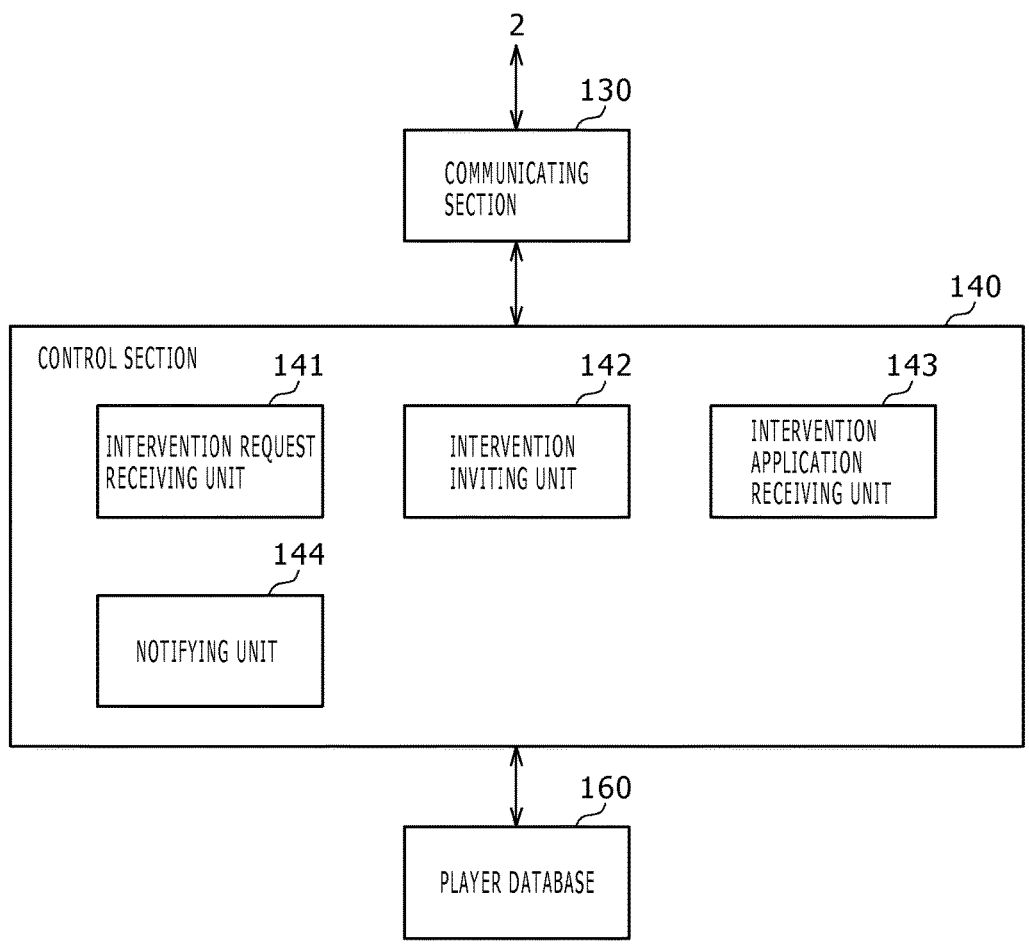
FIG. 11 is a diagram showing a configuration of a matching server according to the first embodiment.

FIG. 11 shows a configuration of the matching server 100 according to the first embodiment. The matching server 100 includes a communicating section 130, a control section 140, and a player database 160. These configurations can also be implemented in various forms by only hardware, only software, or combinations of hardware and software.

The communicating section 130 controls communication via the Internet 2. The communicating section 130 transmits and receives data to and from the first game device 10 and the second game device 200 via the Internet 2. The control section 140 controls matching between the first game device 10 and the second game device 200. The player database 160 stores information on the players of the first game device 10 and the second game device 200.

The control section 140 includes an intervention request receiving unit 141, an intervention inviting unit 142, an intervention application receiving unit 143, and a notifying unit 144.

The intervention request receiving unit 141 receives, from the first game device 10, a request to invite the second game device 200 in game play in the intervention mode in which part of functions of the game controlled by the first game device 10 is controlled according to instruction input from the second game device 200 different from the first game device 10.

The intervention inviting unit 142 presents information on the part of the functions of the game controlled by the first game device 10 whose request for the invitation is received by the intervention request receiving unit 141, and invites the second player for controlling the part of the functions.

The intervention application receiving unit 143 receives an application for intervention by the second player in response to the invitation by the intervention inviting unit 142. The intervention application receiving unit 143 receives information on the second game device 200 of the second player who has applied for the intervention, and stores the information in the player database 160.

The notifying unit 144 reads out, from the player database 160, the information on the second game device 200 from which the application is received by the intervention application receiving unit 143, and notifies the information on the second game device 200 to the first game device 10.

Figure 12:
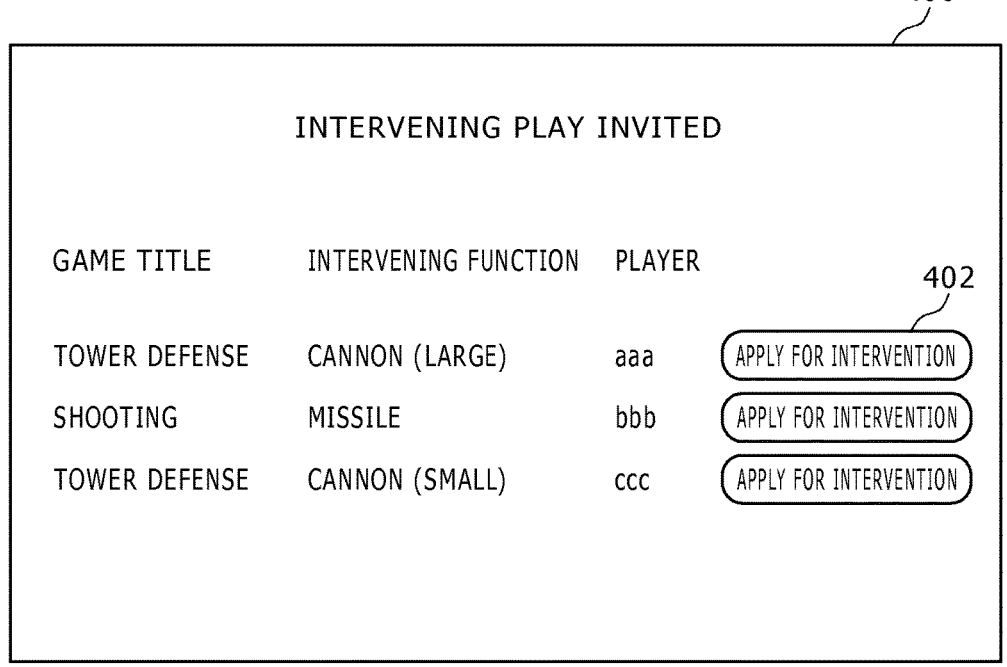
FIG. 12 is a diagram showing an example of an intervention application receiving screen presented by an intervention inviting unit.

FIG. 12 shows an example of an intervention application receiving screen presented by the intervention inviting unit 142. The intervention application receiving screen 400 presents, as contents of the invitation to intervention which contents are received by the intervention request receiving unit 141, the title of the game being executed in the first game device 10, information on an intervening function, and information on the name of the first player of the first game device 10 or the like. The second player looks at the intervention application receiving screen 400, and selects the game of the first game device 10 in which game the second player applies for intervention. When the second player clicks an intervention application button 402, the intervention application receiving unit 143 receives information on the second game device 200 from the second game device 200, and the notifying unit 144 notifies the information on the second game device 200 to the first game device 10. Thereafter direct communication is performed between the first game device 10 and the second game device 200.

Figure 13:
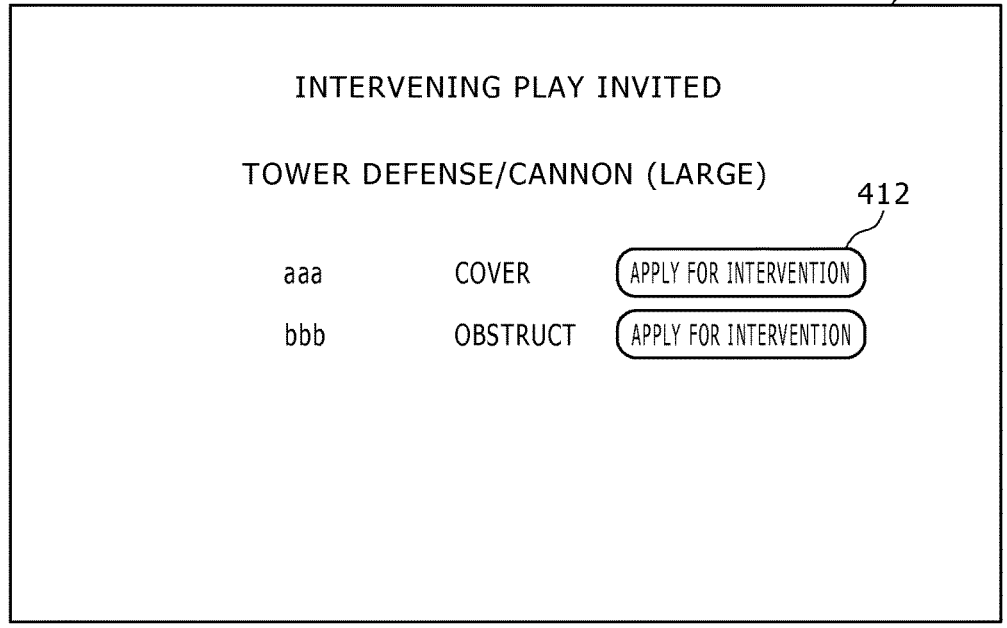
FIG. 13 is a diagram showing another example of the intervention application receiving screen presented by the intervention inviting unit.

FIG. 13 shows another example of the intervention application receiving screen presented by the intervention inviting unit 142. The intervention application receiving screen 410 presents, as contents of the invitation to intervention which contents are received by the intervention request receiving unit 141, information indicating whether the second player is desired to intervene in a covering manner or desired to intervene in an obstructing manner. In the present example, the intervention requesting unit 43 of the first game device 10 notifies the intervention request receiving unit 141 of the matching server 100 whether to request an invitation to intervention in a first mode such as is advantageous for the progress of the game controlled by the control section 40 or to request an invitation to intervention in a second mode such as is disadvantageous for the progress of the game. The intervention inviting unit 142 of the matching server 100 further presents the intervention mode received by the intervention request receiving unit 141, and invites intervention by the second player. When the second player desires intervention in a covering manner in which the second player makes the game progress while cooperating with the first player, the second player selects intervention with the first game device 10 of the first player who desires intervention in the first mode. When the second player desires intervention in an obstructing manner that obstructs the progress of the game by the first player, the second player selects intervention with the first game device 10 of the first player who desires intervention in the second mode. When the second player clicks an intervention application button 412, the intervention application receiving unit 143 receives information on the second game device 200 from the second game device 200, and the notifying unit 144 notifies the information on the second game device 200 to the first game device 10.

The intervention requesting unit 43 of the first game device 10 may automatically select whether to request an invitation to intervention in the first mode or to request an invitation to intervention in the second mode. For example, the intervention requesting unit 43 may obtain a parameter indicating the conditions of progress of the game controlled by the control section 40. When the parameter indicates conditions worse than predetermined conditions, the intervention requesting unit 43 may request the matching server 100 to invite intervention in the first mode. When the parameter indicates conditions better than the predetermined conditions, the intervention requesting unit 43 may request the matching server 100 to invite intervention in the second mode. In addition, when the level of the first player with regard to the game controlled by the control section 40 is lower than a predetermined level, the intervention requesting unit 43 may request the matching server 100 to invite intervention in the first mode. When the level of the first player is equal to or higher than the predetermined level, the intervention requesting unit 43 may request the matching server 100 to invite intervention in the second mode.

The intervention request receiving unit 141 of the matching server 100 may automatically select whether to request an invitation to intervention in the first mode or to request an invitation to intervention in the second mode. For example, the intervention inviting unit 142 may obtain a parameter indicating conditions of progress of the game controlled by the first player. When the parameter indicates conditions worse than predetermined conditions, the intervention inviting unit 142 may make a presentation to the effect that intervention in the first mode is invited. When the parameter indicates conditions better than the predetermined conditions, the intervention inviting unit 142 may make a presentation to the effect that intervention in the second mode is invited.

The intervention request receiving unit 141 may further receive a condition for the second player who intervenes, and the intervention inviting unit 142 may further present the received condition. For example, a condition that the level of the second player with regard to the game in which the second player is to intervene be equal to or higher than a predetermined level may be presented. In this case, the intervention application receiving unit 143 may determine whether or not the second player applying for intervention satisfies the condition, and refuse the application of the second player who does not satisfy the condition.

Figure 14:
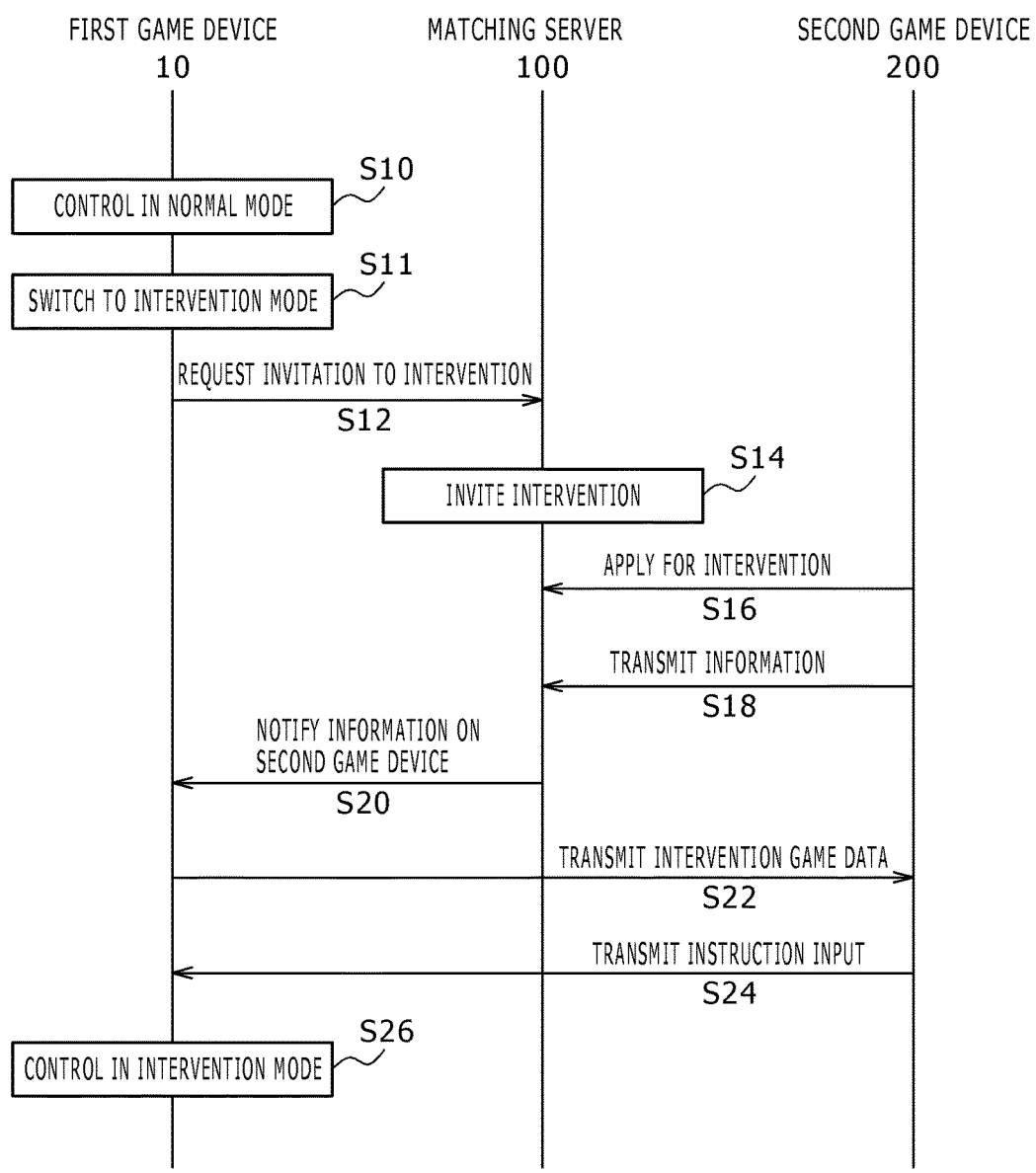
FIG. 14 is a flowchart of a procedure of a game control method according to the first embodiment.

FIG. 14 is a flowchart of a procedure of a game control method according to the first embodiment. The game control unit 41 and the normal mode control unit 46 of the first game device 10 control the game in the normal mode according to instruction input from the first player which instruction input is received by the instruction input receiving unit 44 (S10). When the mode selecting unit 42 receives an instruction to switch to the intervention mode from the first player (S11), the intervention requesting unit 43 requests the matching server 100 to invite the second player who intervenes (S12). When the intervention request receiving unit 141 of the matching server 100 receives the request to invite intervention from the first game device 10, the intervention inviting unit 142 invites the second player who intervenes (S14). When the second player applies for intervention from the second game device 200 to the matching server 100 (S16), the intervention application receiving unit 143 receives information on the second game device 200 which information is transmitted from the second game device 200 (S18). The notifying unit 144 notifies the information on the second game device 200 to the first game device 10 (S20).

The intervention mode control unit 45 transmits data necessary for executing the intervention game to the second game device 200 (S22). The instruction input transmitting unit 244 of the second game device 200 transmits instruction input by the second player for controlling the intervention game to the first game device 10 (S24). The intervention mode control unit 45 controls the intervention game in the intervention mode according to instruction input by the second player which instruction input is received from the second game device 200 (S26).

In the above-described example, the second game device 200 does not have the functions of the game control unit 41, and the progress of the game as a whole is controlled by the control section 40 of the first game device 10. In another example, the second game device 200 may have a similar configuration to that of the first game device 10, and the control sections 40 of both of the first game device 10 and the second game device 200 may control the game as a whole. In this case, information for synchronizing the progress of the game may be exchanged between the control section 40 of the first game device 10 and the control section 40 of the second game device 200.

According to the embodiment, it suffices for the second player to control only part of functions. The second player can therefore casually enjoy the game even when the game requires a high skill level. In addition, it is possible to experience the game actually and actively by intervening as the second player. It is therefore possible to understand the contents of the game, and experience a view of the world of the game. Thus, opportunities for enjoying the game casually can be provided widely, so that the spread of the game can be promoted.

Second Embodiment

Figure 15:
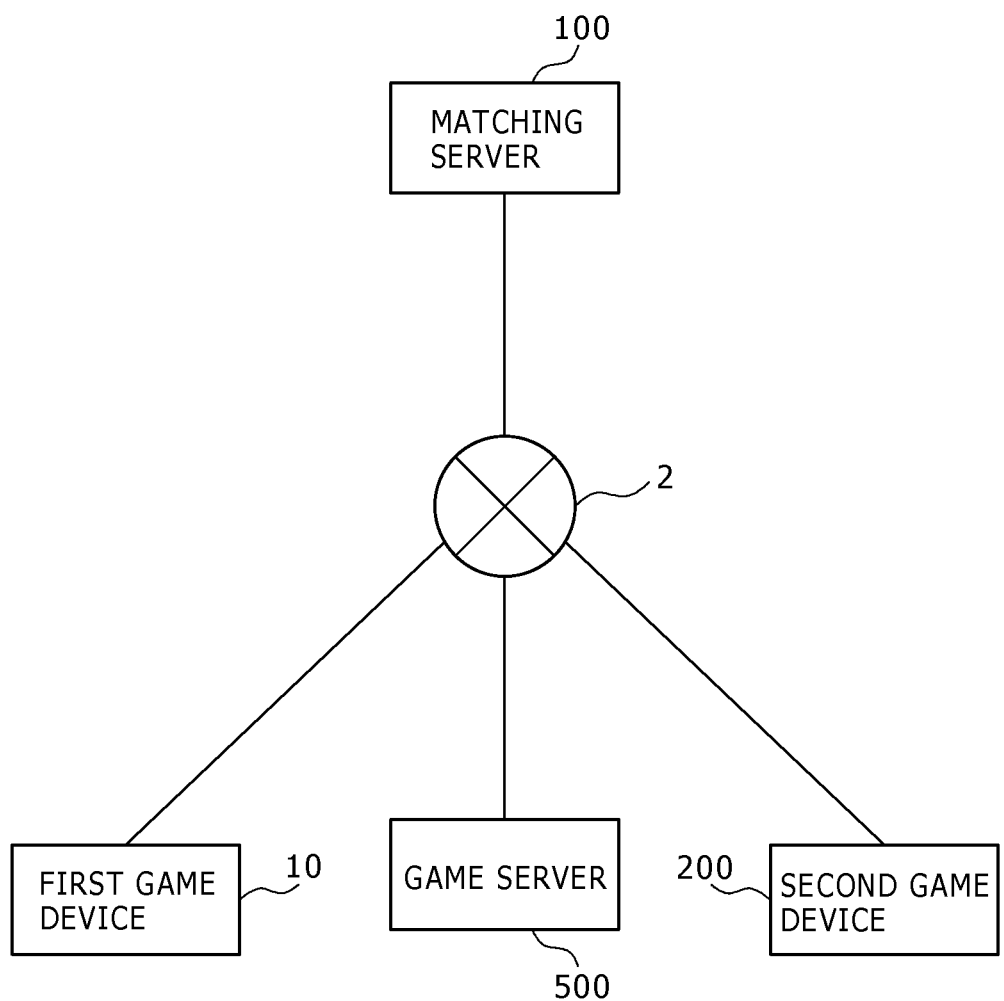
FIG. 15 is a diagram showing a general constitution of a game system according to a second embodiment.

FIG. 15 shows a general constitution of a game system according to a second embodiment. The game system 1 includes a matching server 100 managing matching between players of game devices, a first game device 10 of a first player, a second game device 200 of a second player, and a game server 500 that controls a game. Unlike the first embodiment, the second embodiment enables intervention in an online game controlled by the game server 500 rather than the game controlled by the first game device 10. The first player can connect to the game server 500 from the first game device 10 and enjoy the online game alone, or can enjoy the online game together with the second player while receiving intervention by the second player of the second game device 200. The following description will be made mainly of differences from the first embodiment. The operations and functions of configurations identified by the same reference numerals as in the first embodiment are similar to those of the first embodiment.

Figure 16:
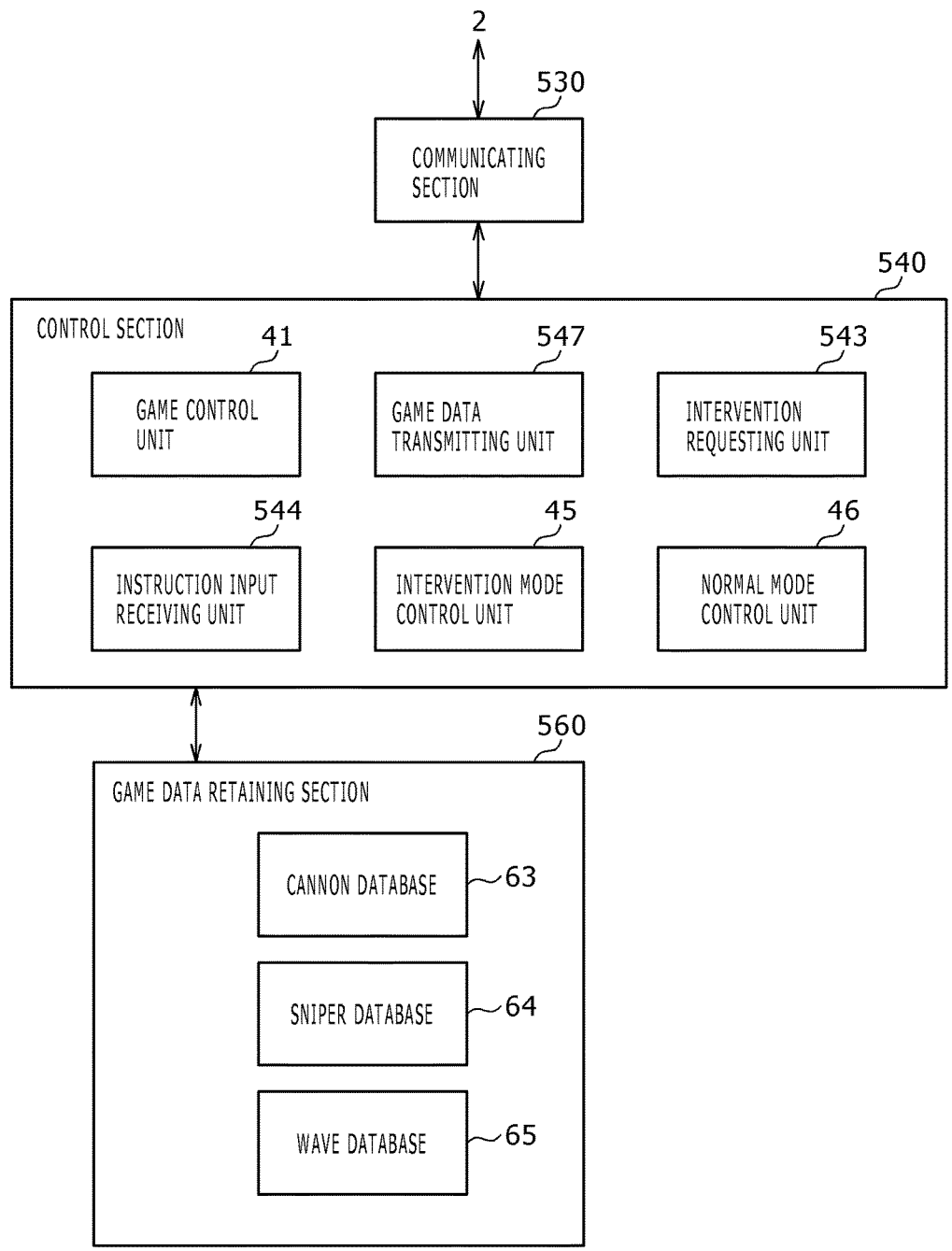
FIG. 16 is a diagram showing a configuration of a game server according to the second embodiment.

FIG. 16 shows a configuration of the game server 500 according to the second embodiment. The game server 500 includes a communicating section 530, a control section 540, and a game data retaining section 560. These configurations can also be implemented in various forms by only hardware, only software, or combinations of hardware and software.

The communicating section 530 controls communication via the Internet 2. The communicating section 530 transmits and receives data to and from the matching server 100, the first game device 10, and the second game device 200 via the Internet 2. The control section 540 makes the game progress on the basis of instruction input by the first player which instruction input is received from the first game device 10. The game data retaining section 560 retains data necessary for the progress of the game and the like. The game data retaining section 560 includes a cannon database 63, a sniper database 64, and a wave database 65.

The control section 540 includes a game control unit 41, an intervention requesting unit 543, an instruction input receiving unit 544, an intervention mode control unit 45, a normal mode control unit 46, and a game data transmitting unit 547.

The instruction input receiving unit 544 receives instruction input by the first player from the first game device 10. The functions of the game control unit 41, the intervention mode control unit 45, and the normal mode control unit 46 are similar to those of the first embodiment.

The game data transmitting unit 547 transmits data necessary for the progress of the game to the first game device 10. In a case where the first game device 10 generates a game screen, the game data transmitting unit 547 transmits data necessary for generating the game screen to the first game device 10. In a case where the game server 500 generates the game screen, the game data transmitting unit 547 generates the game screen to be displayed on the display device 68 of the first game device 10, and transmits the game screen to the first game device 10.

In the intervention mode, the instruction input receiving unit 544 receives instruction input by the second player from the second game device 200. The game data transmitting unit 547 transmits data necessary for the progress of the intervention game to the second game device 200.

The intervention requesting unit 543 requests intervention of the second player in the game controlled by the first player of the first game device 10. The intervention requesting unit 543 automatically requests intervention of the second player when a predetermined condition is satisfied regardless of whether or not there is a request from the first player. The predetermined condition may be for example a condition that a parameter indicating conditions of progress of the game being executed indicate conditions better or worse than predetermined conditions. The intervention requesting unit 543 may request the matching server 100 to invite the second player, or directly request a particular second game device 200 to intervene, or the intervention requesting unit 543 itself may invite the second game device 200 that intervenes. The intervention requesting unit 543 may request the matching server 100 to invite intervention in a covering mode when the parameter indicating conditions of progress of the game being executed indicates conditions worse than the predetermined conditions, or may request the matching server 100 to invite intervention in an obstructing mode when the parameter indicates conditions better than the predetermined conditions.

Figure 17:
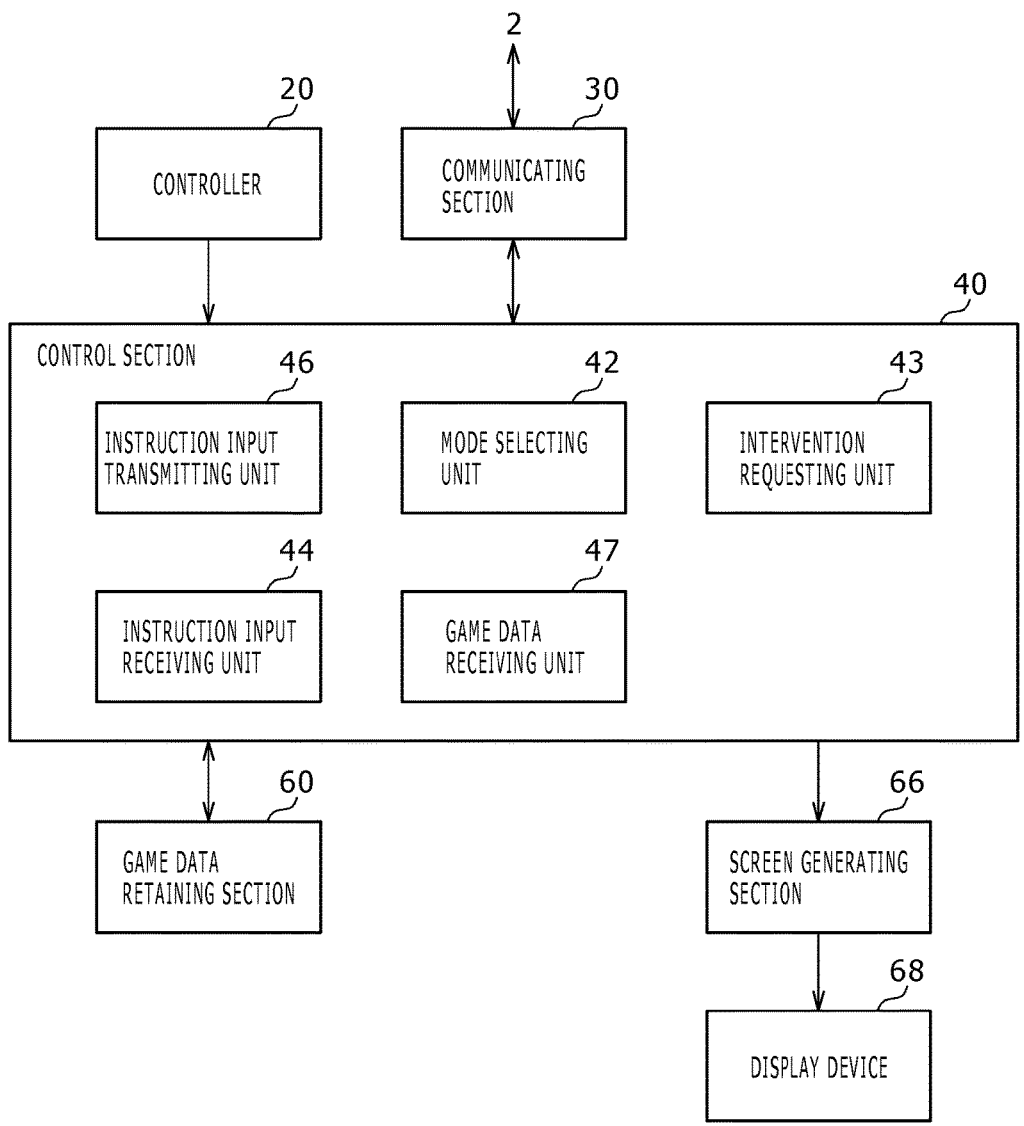
FIG. 17 is a diagram showing a configuration of a first game device according to the second embodiment.

FIG. 17 shows a configuration of the first game device 10 according to the second embodiment. The first game device 10 includes a controller 20, a communicating section 30, a control section 40, a game data retaining section 60, a screen generating section 66, and a display device 68. These configurations can also be implemented in various forms by only hardware, only software, or combinations of hardware and software.

The communicating section 30 controls communication via the Internet 2. The communicating section 30 transmits and receives data to and from the matching server 100, the game server 500, and the second game device 200 via the Internet 2. The control section 40 controls the progress of the game. The game data retaining section 60 retains data necessary for the progress of the game and the like. In the present embodiment, the game is controlled by the game server 500. Therefore the game data retaining section 60 includes none of a cannon database 63, a sniper database 64, and a wave database 65.

The control section 40 includes a mode selecting unit 42, an intervention requesting unit 43, an instruction input receiving unit 44, a game data receiving unit 47, and an instruction input transmitting unit 48.

The instruction input transmitting unit 48 transmits, to the game server 500, instruction input by the first player which instruction input is received by the instruction input receiving unit 44. The game data receiving unit 47 stores game data received from the game server 500 in the game data retaining section 60. The functions of the mode selecting unit 42, the intervention requesting unit 43, and the instruction input receiving unit 44 are similar to those of the first embodiment.

Thus, the online game controlled by the game server 500 can also provide service that enables intervention of the second player in the game controlled by the first player.

The matching server 100 and the game server 500 may be an identical device. In addition, part of the configuration of the matching server 100 may be provided in the game server 500, and part of the configuration of the game server 500 may be provided in the matching server 100. In addition, part of the configurations of the matching server 100 and the game server 500 may be shared.

Third Embodiment

Figure 18:
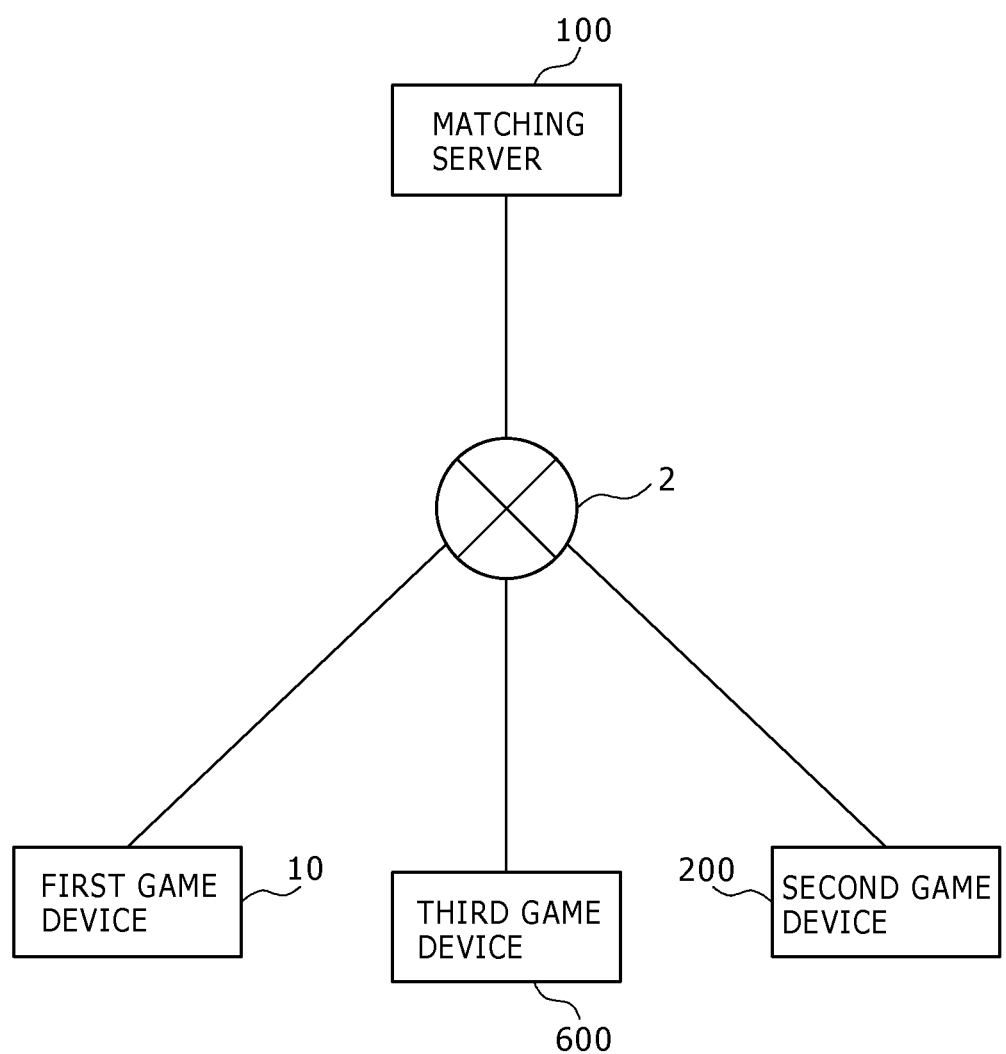
FIG. 18 is a diagram showing a general constitution of a game system according to a third embodiment.

FIG. 18 shows a general constitution of a game system according to a third embodiment. The game system 1 includes a matching server 100 managing matching between players of game devices, a first game device 10 of a first player, a second game device 200 of a second player, and a third game device 600 of a third player. The third embodiment enables intervention of the second player of the second game device 200 in a battle game between the first player of the first game device 10 and the third player of the third game device 600. The following description will be made mainly of differences from the first embodiment. The operations and functions of configurations identified by the same reference numerals as in the first embodiment are similar to those of the first embodiment.

The configurations of the first game device 10, the second game device 200, and the matching server 100 are similar to those of the first embodiment. In addition, the configuration of the third game device 600 is similar to the configuration of the first game device 10 in the first embodiment. The battle game may be executed by directly transmitting and receiving data between the first game device 10 and the third game device 600, or the game server 500 may control the battle game as in the second embodiment.

The intervention request receiving unit 141 of the matching server 100 receives a request to invite intervention by the second player from the intervention requesting unit 43 of the first game device 10 or the third game device 600. The intervention application receiving unit 143 receives an application for intervention by the second player in the battle game. The second player can intervene in a mode of covering the first player and obstructing the third player, or can intervene in a mode of obstructing the first player and covering the third player.

Figure 19:
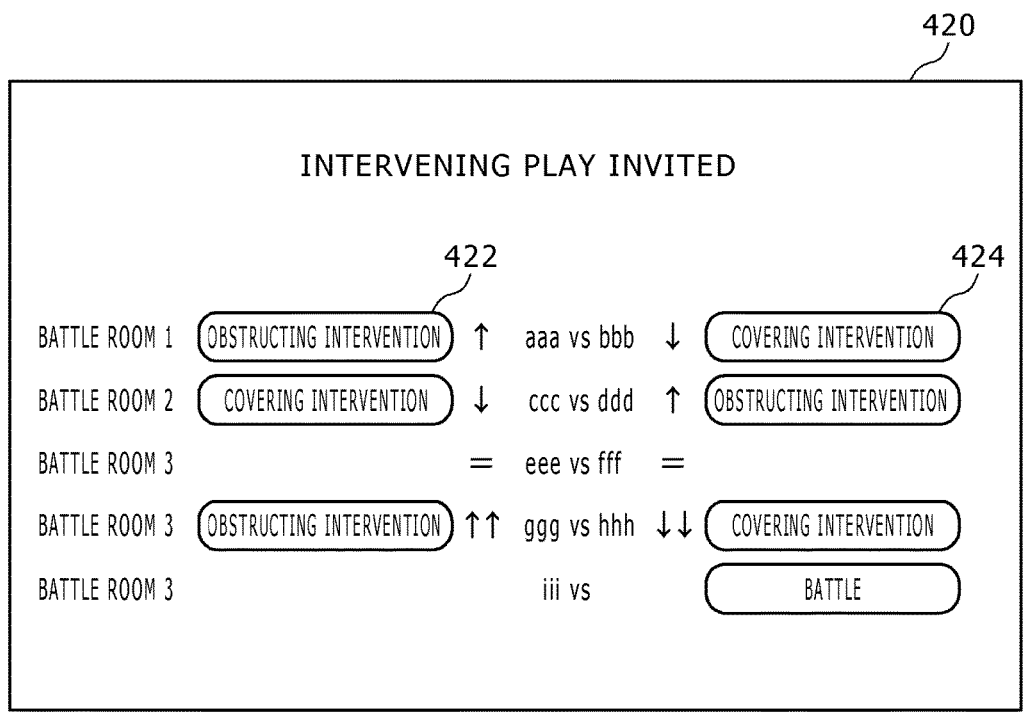
FIG. 19 is a diagram showing an example of an intervention application receiving screen presented by an intervention inviting unit.

FIG. 19 shows an example of an intervention application receiving screen presented by the intervention inviting unit 142. The intervention application receiving screen 420 is an intervention application receiving screen in a case where the second player of the second game device 200 intervenes in the battle game between the first player of the first game device 10 and the third player of the third game device 600. The intervention application receiving screen 420 presents the names of the players of the first game device 10 and the third game device 600, which players are engaging in battle with each other, as well as battle conditions. The second player of the second game device 200 can intervene in an obstructing manner for a player side at an advantage, or can intervene in a covering manner for a player side at a disadvantage. When the second player clicks an obstructing intervention application button 422, the intervention application receiving unit 143 receives information on the second game device 200 from the second game device 200, and the notifying unit 144 notifies the information on the second game device 200 to the first game device 10. When the second player clicks a covering intervention application button 424, the intervention application receiving unit 143 receives the information on the second game device 200 from the second game device 200, and the notifying unit 144 notifies the information on the second game device 200 to the third game device 600.

The intervention requesting unit 43 of the first game device 10 or the third game device 600 may select whether to request an invitation to intervention in the first mode or to request an invitation to intervention in the second mode according to an instruction from the first player or the third player, or automatically select whether to request an invitation to intervention in the first mode or to request an invitation to intervention in the second mode. In the latter case, for example, the intervention requesting unit 43 may obtain a parameter indicating conditions of progress of the game. When the parameter indicates conditions worse than predetermined conditions, the intervention requesting unit 43 may request the matching server 100 to invite intervention in the first mode. When the parameter indicates conditions better than the predetermined conditions, the intervention requesting unit 43 may request the matching server 100 to invite intervention in the second mode. In addition, when the level of the first player with regard to the game controlled by the control section is lower than a predetermined level, the intervention requesting unit 43 may request the matching server 100 to invite intervention in the first mode. When the level of the first player is equal to or higher than the predetermined level, the intervention requesting unit 43 may request the matching server 100 to invite intervention in the second mode. When the intervention inviting unit 142 of the matching server 100 is requested from one game device to invite intervention, the intervention inviting unit 142 may not invite intervention with the other game device, or may invite intervention with the other game device in an opposite mode.

The intervention request receiving unit 141 of the matching server 100 may automatically select whether to request an invitation to intervention in the first mode or to request an invitation to intervention in the second mode. For example, the intervention request receiving unit 141 may obtain a parameter indicating conditions of progress of the battle game. When the parameter indicates that the first game device 10 is at a disadvantage, the intervention inviting unit 142 may make a presentation to the effect that intervention with the first game device 10 in the first mode is invited and intervention with the third game device in the second mode is invited. When the parameter indicates that the first game device 10 is at an advantage, the intervention inviting unit 142 may make a presentation to the effect that intervention with the first game device 10 in the second mode is invited and intervention with the third game device in the first mode is invited. In addition, the intervention request receiving unit 141 may obtain the levels of the players of the first game device 10 and the third game device. When the level of the player of the first game device 10 is lower than the level of the player of the third game device, the intervention inviting unit 142 may make a presentation to the effect that intervention with the first game device 10 in the first mode is invited and intervention with the third game device in the second mode is invited. When the level of the player of the first game device 10 is higher than the level of the player of the third game device, the intervention inviting unit 142 may make a presentation to the effect that intervention with the first game device 10 in the second mode is invited and intervention with the third game device in the first mode is invited. When a difference between the levels of the first player and the third player is less than a predetermined value, the intervention of the second player may not be invited. When the difference between the levels is equal to or more than the predetermined value, the intervention of the second player may be invited.

The present invention has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present invention.

A service may be provided which enables chats, messages, and the like to be transmitted and received between the first player or the third player and the second player who intervenes. In addition, the second player who has intervened may be provided with benefits such as points or the like.

In the foregoing embodiment, a game of the tower defense type has been described, but there may be games of other types. For example, in a game in which a player's character and an enemy character move in a game field, the second player may control part of the movement, attack, action, and the like of the enemy character or a character on the player side. In addition, the second player may control the disposition, movement, changing, and the like of an item, an obstacle, and the like disposed in a game field. In addition, the second player may control the timing, kind, and the like of an event occurring in a game field.

There may be a training type simulation game related to one or a plurality of characters. For example, in a game in which a soccer team is trained, the first player may train the team as a coach, and the second player may control part of individual players. In addition, in a game in which a racing team is trained, the second player may control a driver. The individual characters of these games are automatically controlled by a computer in a normal mode.

There may be a so-called falling object puzzle in which objects are made to fall in a game field and objects satisfying a predetermined condition are erased. The second player may control a kind of object to be made to fall in the game field next.

In the foregoing embodiment, intervention in the game by the second player is realized in a form of allowing the second player to control part of functions of the game. However, the function controlled by the second player may be a function not provided in the normal mode. Specifically, the second player may be allowed to control a new function of covering or obstructing the progress of the game by the first player. For example, in a game that sets an objective of performing specified operating input so as to be well timed to music, the second player may be allowed to insert interjections by controlling the output of a particular sound. In addition, in a shooting game, a golf game, or the like, the second player may be allowed to assist in operating input by the first player, or perform particular operating input for improving accuracy, power, or the like.

REFERENCE SIGNS LIST

10: First game device, 20: Controller, 30: Communicating section, 40: Control section, 41: Game control unit, 42: Mode selecting unit, 43: Intervention requesting unit, 44: Instruction input receiving unit, 45: Intervention mode control unit, 46: Normal mode control unit, 60: Game data retaining section, 66: Screen generating section, 68: Display device, 100: Matching server, 130: Communicating section, 140: Control section, 141: Intervention request receiving unit, 142: Intervention inviting unit, 143: Intervention application receiving unit, 144: Notifying unit, 160: Player database, 200: Second game device, 220: Input section, 230: Communicating section, 240: Control section, 241: Intervention applying unit, 242: Game data receiving unit, 243: Intervention game control unit, 244: Instruction input transmitting unit, 260: Game data retaining section, 266: Screen generating section, 268: Display device.

INDUSTRIAL APPLICABILITY

The present invention is applicable to a game device that controls a game executed between a plurality of players or a matching server.

The invention claimed is:

1. A non-transitory, computer readable recording medium containing a game control program, which when executed by a computer, causes the computer to implement:
   by an instruction input receiving unit, receiving instruction input from a first player, and notifying the instruction input to a control section controlling a game, where the first player is permitted control of functions of a whole of the game according to the game control program, and where the instruction input from the first player results in a condition of progress of the game by the first player during gameplay;
   by a mode selecting unit, receiving, from the first player, a selection of one of: (i) an intervention mode in which part of the functions is controlled according to instruction input from a second player different from the first player, and (ii) a normal mode in which none of the functions are controlled by instruction input from the second player;
   by a screen display section, obtaining information necessary to display a game screen from the control section, and displaying the game screen on a display device, the control section receiving the instruction input from the second player and controlling the part of the functions when the intervention mode is selected, the control section controlling the part of the functions without depending on the instruction input from the second player when the normal mode is selected; and
   by an intervention requesting unit, requesting a matching server managing matching between the first player and the second player to invite the second player controlling the part of the functions, where the intervention requesting unit notifies the matching server whether to invite the second player to intervene in: (i) a first mode advantageous to the condition of progress of the game by the first player during gameplay via cooperation with the first player, or (ii) a second mode disadvantageous to the condition of progress of the game by the first player during gameplay via opposition to the first player,
   wherein the intervention requesting unit requests the matching server to invite the second player to intervene in the first mode when the condition of progress of the game by the first player during gameplay is below a predetermined level of progress, and
   wherein the intervention requesting unit requests the matching server to invite the second player to intervene in the second mode when the condition of progress of the game by the first player during gameplay is above the predetermined level of progress.

2. The non-transitory, computer readable recording medium containing the game control program according to claim 1, wherein the game control program further causes the computer to implement:
   by an intervention mode control unit, when the intervention mode is selected, transmitting information necessary to control the part of the functions to a game device of the second player, receiving the instruction input from the second player, and controlling the part of the functions, and
   by a normal mode control unit, when the normal mode is selected, controlling the part of the functions without depending on the instruction input from the second player, the control section including the intervention mode control unit and the normal mode control unit.

3. The non-transitory, computer readable recording medium containing the game control program according to claim 2, wherein the normal mode control unit generates instruction input for controlling the part of the functions according to a predetermined condition, and controls the part of the functions.

4. The non-transitory, computer readable recording medium containing the game control program according to claim 1, wherein the intervention mode control unit receives the instruction input from the second player matched by the matching server, and controls the part of the functions.

5. The non-transitory, computer readable recording medium containing the game control program according to claim 1, wherein the intervention requesting unit requests the matching server to invite intervention in the first mode when a level of the player with regard to the game is lower than a predetermined level, and requests the matching server to invite intervention in the second mode when the level of the player is equal to or higher than the predetermined level.

6. The non-transitory, computer readable recording medium containing the game control program according to claim 1, wherein the intervention mode control unit determines whether the matching server is to invite intervention in a first mode advantageous to progress of the game or to invite intervention in a second mode disadvantageous to the progress of the game according to a condition of progress of the game or a level of the first player with regard to the game, receives the instruction input from the second player responding to an invitation to intervention in the determined mode, and controls the part of the functions.

7. A game device comprising:
an instruction input receiving unit receiving instruction input from a first player, and notifying the instruction input to a control section controlling a game, where the first player is permitted control of functions of a whole of the game according to the game control program, and where the instruction input from the first player results in a condition of progress of the game by the first player during gameplay;
a mode selecting unit, receiving, from the first player, a selection of one of: (i) an intervention mode in which part of the functions is controlled according to instruction input from a second player different from the first player, and (ii) a normal mode in which none of the functions are controlled by instruction input from the second player;
a screen display section, obtaining information necessary to display a game screen from the control section, and displaying the game screen on a display device, the control section receiving the instruction input from the second player and controlling the part of the functions when the intervention mode is selected, the control section controlling the part of the functions without depending on the instruction input from the second player when the normal mode is selected; and
an intervention requesting unit, requesting a matching server managing matching between the first player and the second player to invite the second player controlling the part of the functions, where the intervention requesting unit notifies the matching whether to invite the second player to intervene in: (i) a first mode advantageous to the condition of progress of the game by the first player during gameplay via cooperation with the first player, or (ii) a second mode disadvantageous to the condition of progress of the game by the first player during gameplay via opposition to the first player,
wherein the intervention requesting unit requests the matching server to invite the second player to intervene in the first mode when the condition of progress of the game by the first player during gameplay is below a predetermined level of progress, and
wherein the intervention requesting unit requests the matching server to invite the second player to intervene in the second mode when the condition of progress of the game by the first player during gameplay is above the predetermined level of progress.

8. A game control method comprising:
receiving instruction input from a first player, and notifying the instruction input to a control section controlling a game, where the first player is permitted control of functions of a whole of the game according to the game control program, and where the instruction input from the first player results in a condition of progress of the game by the first player during gameplay;
receiving, from the first player, a selection of one of: (i) an intervention mode in which part of the functions is controlled according to instruction input from a second player different from the first player, and (ii) a normal mode in which none of the functions are controlled by instruction input from the second player;
obtaining information necessary to display a game screen from the control section, and displaying the game screen on a display device, the control section receiving the instruction input from the second player and controlling the part of the functions when the intervention mode is selected, the control section controlling the part of the functions without depending on the instruction input from the second player when the normal mode is selected; and
requesting a matching server managing matching between the first player and the second player to invite the second player controlling the part of the functions, where the requesting notifies the matching server whether to invite the second player to intervene in: (i) a first mode advantageous to the condition of progress of the game by the first player during gameplay via cooperation with the first player, or (ii) a second mode disadvantageous to the condition of progress of the game by the first player during gameplay via opposition to the first player,
wherein the requesting includes requesting the matching server to invite the second player to intervene in the first mode when the condition of progress of the game by the first player during gameplay is below a predetermined level of progress, and
wherein the requesting include requesting the matching server to invite the second player to intervene in the second mode when the condition of progress of the game by the first player during gameplay is above the predetermined level of progress.

9. A non-transitory, computer readable recording medium containing a matching control program, which when executed by a computer, causes the computer to implement:
by an intervention application receiving unit, presenting information on functions of a game controlled according to instruction input from a first player in order to invite a second player different from the first player to intervene in the game in an intervention mode in which part of the functions of the game is controlled according to instruction input from the second player, and receiving an application for intervention that controls the part of the functions, where the instruction input from the first player results in a condition of progress of the game by the first player during gameplay; and
by a notifying unit, notifying information on a game device of the second player whose application is received by the intervention application receiving unit to a control section controlling the game, wherein:
the first player is permitted control of functions of a whole of the game according to a game control program; and in the intervention mode, the part of the functions is controlled according to instruction input from the second player, in a normal mode, none of the functions are controlled by instruction input from the second player, and the intervention requesting unit notifies the matching server whether to invite the second player to intervene in: (i) a first mode advantageous to the condition of progress of the game by the first player during gameplay via cooperation with the first player, or (ii) a second mode disadvantageous to the condition of progress of the game by the first player during gameplay via opposition to the first player, wherein the intervention requesting unit requests the matching server to invite the second player to intervene in the first mode when the condition of progress of the game by the first player during gameplay is below a predetermined level of progress, and wherein the intervention requesting unit requests the matching server to invite the second player to intervene in the second mode when the condition of progress of the game by the first player during gameplay is above the predetermined level of progress.

10. The non-transitory, computer readable recording medium containing the matching control program according to claim 9, wherein the matching control program further causes the computer to implement, by an intervention request receiving unit, receiving a request to invite the second player from the first player.

11. The non-transitory, computer readable recording medium containing the matching control program according to claim 10, wherein the intervention application receiving unit further presents the mode of intervention received by the intervention request receiving unit, and receives the application for the intervention.

12. The non-transitory, computer readable recording medium containing the matching control program according to claim 9, wherein the intervention request receiving unit obtains a parameter indicating a condition of progress of the game, and the intervention application receiving unit makes a presentation to an effect that intervention in the first mode is invited when the parameter indicates a condition worse than a predetermined condition, and makes a presentation to an effect that intervention in the second mode is invited when the parameter indicates a condition better than the predetermined condition.

13. The non-transitory, computer readable recording medium containing the matching control program according to claim 9, wherein the game is a battle game executed between the first player and a third player, the intervention request receiving unit obtains a parameter indicating a condition of progress of the battle game, and when the parameter indicates that the first player is at a disadvantage, the intervention application receiving unit makes a presentation to an effect that intervention in the first mode with the first player is invited and intervention in the second mode with the third player is invited, and when the parameter indicates that the first player is at an advantage, the intervention application receiving unit makes a presentation to an effect that intervention in the second mode with the first player is invited and intervention in the first mode with the third player is invited.

14. The non-transitory, computer readable recording medium containing the matching control program according to claim 9, wherein the game is a battle game executed between the first player and a third player, the intervention request receiving unit obtains respective levels of the first player and the third player, and when the level of the first player is lower than the level of the third player, the intervention application receiving unit makes a presentation to an effect that intervention in the first mode with the first player is invited and intervention in the second mode with the third player is invited, and when the level of the first player is higher than the level of the third player, the intervention application receiving unit makes a presentation to an effect that intervention in the second mode with the first player is invited and intervention in the first mode with the third player is invited.

15. A matching server comprising:

an intervention application receiving unit presenting information on functions of a game controlled according to instruction input from a first player in order to invite a second player different from the first player to intervene in the game in an intervention mode in which part of the functions of the game is controlled according to instruction input from the second player, and receiving an application for intervention that controls the part of the functions, where the instruction input from the first player results in a condition of progress of the game by the first player during gameplay; and a notifying unit notifying information on a game device of the second player whose application is received by the intervention application receiving unit to a control section controlling the game, wherein:

the first player is permitted control of functions of a whole of the game according to a game control program; and in the intervention mode, the part of the functions is controlled according to instruction input from the second player, in a normal mode, none of the functions are controlled by instruction input from the second player, and the intervention requesting unit notifies the matching server whether to invite the second player to intervene in: (i) a first mode advantageous to the condition of progress of the game by the first player during gameplay via cooperation with the first player, or (ii) a second mode disadvantageous to the condition of progress of the game by the first player during gameplay via opposition to the first player, wherein the intervention requesting unit requests the matching server to invite the second player to intervene in the first mode when the condition of progress of the game by the first player during gameplay is below a predetermined level of progress, and wherein the intervention requesting unit requests the matching server to invite the second player to intervene in the second mode when the condition of progress of the game by the first player during gameplay is above the predetermined level of progress.

16. A matching control method comprising:

presenting information on functions of a game controlled according to instruction input from a first player in order to invite a second player different from the first player to intervene in the game in an intervention mode in which part of the functions of the game is controlled according to instruction input from the second player, and receiving an application for intervention that controls the part of the functions, where the instruction input from the first player results in a condition of progress of the game by the first player during gameplay; and notifying information on a game device of the second player whose application is received by the invite to a control section controlling the game, wherein:

the first player is permitted control of functions of a whole of the game according to a game control program; and in the intervention mode, the part of the functions is controlled according to instruction input from the second player, in a normal mode, none of the functions are controlled by instruction input from the second player, and the invite includes notifying the matching server whether to invite the second player to intervene in: (i) a first mode advantageous to the condition of progress of the game by the first player during gameplay via cooperation with the first player, or (ii) a second mode disadvantageous to the condition of progress of the game by the first player during gameplay via opposition to the first player, wherein the requesting includes requesting the matching server to invite the second player to intervene in the first mode when the condition of progress of the game by the first player during gameplay is below a predetermined level of progress, and wherein the requesting includes requesting the matching server to invite the second player to intervene in the second mode when the condition of progress of the game by the first player during gameplay is above the predetermined level of progress.

* * * * *